United States Patent [19]
Iacobelli et al.

[11] 3,887,545
[45] June 3, 1975

[54] SYNTHESIS OF 1α-HYDROXYLATED CHOLESTEROL DERIVATIVES

[75] Inventors: Jerome Anthony Iacobelli, Woodside; Thomas Albert Narwid, Pompton Plains; Milan Radoje Uskokovic, Upper Montclair, all of N.J.

[73] Assignee: Hoffmann-La Roche Inc., Nutley, N.J.

[22] Filed: Nov. 12, 1973

[21] Appl. No.: 415,186

[52] U.S. Cl............................ 260/239.55 R, 260/239.55 C, 260/397.2; 424/241
[51] Int. Cl.² ............................ C07C 173/00

[58] Field of Search ............... 260/397.2, 239.55 R; /Machine Searched Steroids

[56] References Cited
UNITED STATES PATENTS
3,080,937  3/1963  Bowers et al. ............... 260/397.4

Primary Examiner—Elbert L. Roberts
Attorney, Agent, or Firm—Samuel L. Welt; Jon S. Saxe; George M. Gould

[57] ABSTRACT

Synthesis of 1 α-hydroxylated cholesterol derivatives, particularly 1α-hydroxycholesterol and 1α,25-dihydroxycholesterol and intermediates therefor.

28 Claims, No Drawings

SYNTHESIS OF 1α-HYDROXYLATED CHOLESTEROL DERIVATIVES

BACKGROUND OF THE INVENTION

It is well known that 1α-hydroxylated derivatives and metabolites of Vitamin $D_3$ (cholecalciferol), particularly 1α-hydroxycholecalciferol and 1α,25-dihydroxycholecalciferol are more active than the vitamin itself for intestinal calcium transport and bone calcium mobilization. See, for example, the review article on this subject by DeLuca, et al., Physiological Reviews, Vol. 53, 327 (1973).

Recently, DeLuca et al., in U.S. Pat. No. 3,741,996 described a synthesis of 1α-hydroxycholecalciferol from cholesterol; and in Tetrahedron Letters, 1972, page 4147 described a synthesis of 1α,25-dihydroxycholecalciferol which involved, as an intermediate, the triacetate of 1α,25-dihydroxycholesterol.

A new synthesis of 25-hydroxycholesterol has recently been described by Narwid and Uskokovic in U.S. Pat. application Ser. No. 371,091. Thus, it would be desirable to be able to convert 25-hydroxycholesterol to 1α,25-dihydroxycholesterol or a derivative thereof, which could then be readily converted to 1α,25-dihydroxycholecalciferol. A general synthetic method which allowed for the introduction of a 1α-hydroxy group into the cholesterol-type nucleus, would thus be a major advance for the ultimate synthesis of 1α-hydroxylated forms of Vitamin $D_3$.

DETAILED DESCRIPTION OF THE INVENTION

The present invention relates to a method for synthesizing 1α-hydroxycholesterol derivatives, most notably 1α-hydroxycholesterol and 1α,25-dihydroxycholesterol. More particularly, the present invention involves a multi-step synthesis of 1α-hydroxycholesterol from cholesterol and 1α,25-dihydroxycholesterol from 25-hydroxycholesterol.

In the formulae presented herein, the various substituents are illustrated as joined to the steroid nucleus by one of three notations: a solid line (——) indicating a substituent which is in the β-orientation (i.e., above the plane of the molecule), a dotted line (---) indicating a substituent which is in the α-orientation (i.e., below the plane of the molecule), or a wavy line (∼∼∼) indicating a substituent which may be in the α- or β-orientation or may be a mixture of both forms. The formulae have all been drawn to show the compounds in their absolute stereochemical configuration. Inasmuch as the starting materials, as well as the final products, are derived from naturally occurring materials, they exist in the single absolute configuration depicted herein. However, the process of the present invention is intended to apply as well to the synthesis of steroids of the racemic series. Thus, one may begin the synthesis utilizing racemic starting material to prepare racemic product. Optically active product can be prepared by optical resolution of racemic product or of an intermediate utilized in the preparation thereof, as hereinafter described, by standard resolution techniques well known in the art, for example, involving fractional crystallization of diastereomeric salts.

The starting material for the present synthetic method is a cholesterol derivative of formula I

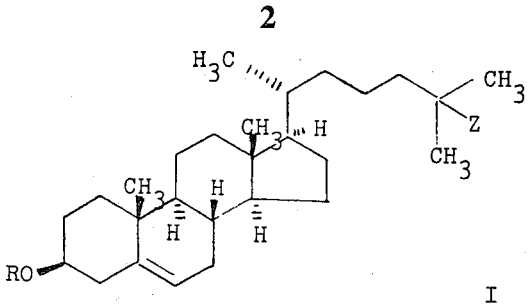

wherein R is hydrogen or acyl and Z is hydrogen or hydroxyl.

In the first reaction step, the compound of formula I is converted to a compound of formula II

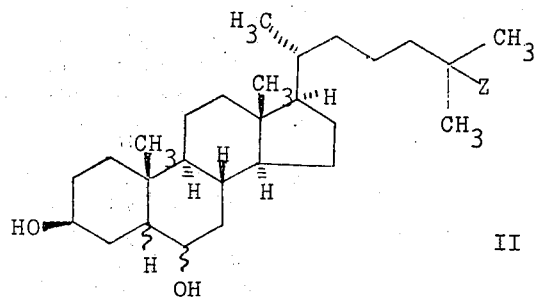

wherein Z is as above, by means of a hydroboration. The hydroboration is accomplished in two steps. The first step involves the treatment of the compound of formula I with borane ($BH_3$) or a higher form thereof, such as diborane ($B_2H_6$) or a complex of borane with an ethereal solvent such as tetrahydrofuran. The reaction is generally carried out in an aprotic solvent medium, most preferably an ether such as tetrahydrofuran, dioxane, and the like. The hydroboration reaction is suitably performed at a temperature of from about 0° to about 50°, most preferably from about 0° to about 20°C. The intermediate organoborane thus formed is then oxidized in situ in the second step to the compound of formula II by treatment with hydrogen peroxide in the presence of an aqueous base such as an alkali metal hydroxide, e.g., sodium hydroxide. This reaction is also carried out at a temperature from about 0° to about 50°, most preferably from about 0° to about 20°C. The base and peroxide are suitably added in aqueous media and the final reaction mixture normally comprises a mixture of water and the original solvent utilized, e.g., tetrahydrofuran.

The product of the hydroboration reaction is normally a mixture of 5α-H,6α-ol and 5β-H,6β-ol, that is a compound of formula II wherein the hydrogen in the 5-position and the hydroxy in the 6-position are cis to one another, that is, either both α or both β. Since in the next reaction step, the 6-hydroxy group of formula II is oxidized to a 6-ketone and any product containing a 5β-hydrogen is isomerized to the 5α-H compound, there is no need to separate the crude mixture of products obtained from the hydroboration, as only one product will be formed after oxidation to the 6-ketone (the 5α-H-6-ketone).

In the next step, as just mentioned, the crude mixture of compound of formula II is oxidized to ketone of formula III

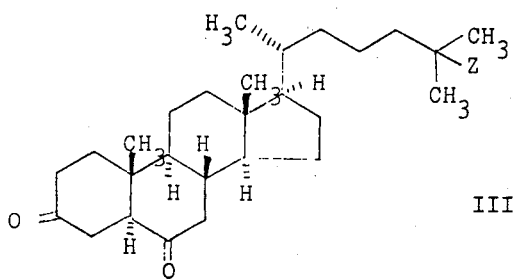

III wherein Z is as above.

This reaction is accomplished utilizing standard oxidation techniques, for example, the use of chromium reagents such as chromic oxide and sulfuric acid (Jones reagent) or potassium dichromate. This oxidation is suitably carried out in any solvent medium which is inert to the oxidation conditions, for example, in the case of Jones reagent, aqueous acetone; or aqueous acetic acid. The temperature is suitably between about 0° and about +20°C.

The intermediate organoborane formed in the hydroboration step can also be directly oxidized to the ketone of formula III by treatment of the organoborane with, for example, chromic oxide.

In the next reaction step, the 3,6-diketone of formula III is selectively ketalized to afford the 3-ketal of formula IV

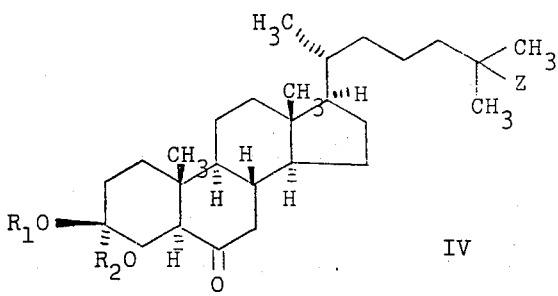

IV wherein $R_1$ and $R_2$ taken independently are each lower alkyl, and $R_1$ and $R_2$ taken together are lower alkylene of from 2 to 4 carbon atoms, and Z is as above.

Suitable ketal protecting groups are those derived from lower alkanols such as methanol and ethanol (i.e., dimethyl or diethyl ketals), or ketals derived from lower alkylene diols such as, for example, ethylene glycol, 1,3-propylene glycol, 2,3-butyleneglycol and so forth. The ketalization is carried out utilizing standard conditions for reactions of this type involving the treatment of the carbonyl compound with an excess of lower alkanol or lower alkylene diol, or a reagent which is a precursor of the same, such as trimethyl orthoformate, etc. The ketalization reaction is carried out in the presence of a small amount of an acid catalyst, such as, for example, p-toluenesulfonic acid, oxalic acid, acetic acid, selenium dioxide, and so forth. Normally, the water of reaction is removed either by means of an azeotrope with a solvent, or by means of a dehydrating agent, such as, for example, molecular sieves. If one desires to prepare a di-lower alkyl ketal by utilizing a lower alkanol, the lower alkanol itself can serve as the reaction medium. For preparation of lower alkylene ketals, such as an ethyl ketal, the reaction may be carried out in a hydrocarbon solvent such as toluene, in which case the water of reaction may be conveniently removed as an azeotrope.

The ketalization may be performed at a temperature range of from about 0° to about 100°C, most preferably, from about 20° to about 60°C.

In the next reaction step, the protected compound of formula IV is converted to the 6β-hydroxy compound of formula V

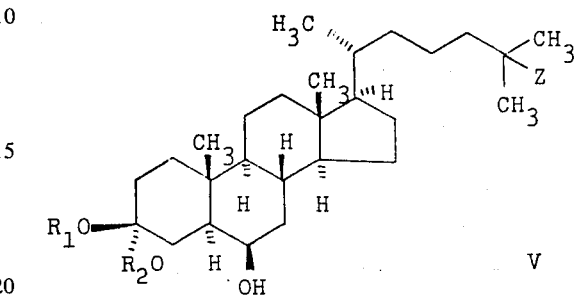

V wherein $R_1$, $R_2$ and Z are as above,
by means of a reduction with a complex metal hydride reducing agent. Among the complex metal hydride reducing agents which can be mentioned are alkali metal borohydrides, such as sodium borohydride, lithium borohydride and sodium cyanoborohydride; alkali metal aluminum hydrides such as lithium aluminum hydride; and lower alkoxy derivatives of the above, such as, for example, lithium tris(t-butoxy)aluminum hydride, sodium diethoxy borohydride, sodium dihydro bis(2-methoxy-ethoxy)aluminate; alkyl aluminum hydrides, such as, for example, diisobutyl aluminum hydride; and so forth. Particularly preferred reducing agents for this purpose are alkali metal borohydrides such as sodium borohydride.

The reduction is carried out in the normal fashion for the reduction of ketones to alcohols utilizing complex metal hydride reducing agents. In the case of alkali metal aluminum hydrides, such as lithium aluminum hydride, and alkyl aluminum hydrides, such as diisobutyl aluminum hydride, the reaction must be carried out in aprotic solvent medium such as, for example, an ether or a hydrocarbon. In the case of alkali metal borohydrides and lower alkoxy derivatives thereof, the reaction may be carried out in an aqueous or aqueous alcoholic solvent. The temperature for effecting such a reduction may be in the range of from about −20° to about +100°C, most preferably from about 0° to about +40°C.

In the next step, the 6β-alcohol of formula V is deketalized to afford the 3-ketone of formula VI

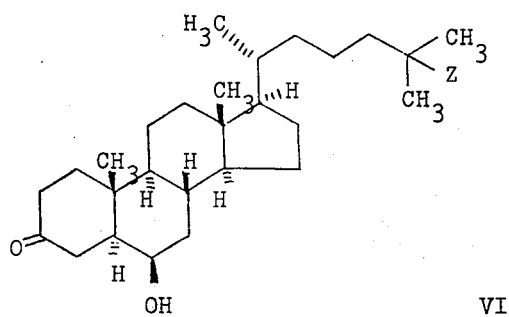

VI wherein Z is as above.

This reaction is effected by treatment of the ketal with an acid in the presence of water. Suitable acids for this purpose include, for example, mineral acids such as hydrochloric acid and sulfuric acid; organic sulfonic acids such as p-toluensulfonic acid; organic acids such as acetic acid, and so forth. Normally, one utilizes an organic solvent medium to aid in the solubilization of the reactants. Suitable solvent media include those that are miscible or partially miscible with water, such as lower alkanols, acetonitrile, tetrahydrofuran, acetone, and so forth. The deketalization may be effected at a temperature of from about −40° to about +40°C.

In the next step, the 3-ketone of formula VI is brominated to afford the 2α-bromo compound of formula VII

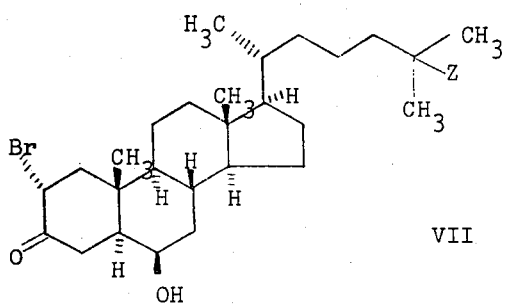

VII wherein Z is as above.

The bromination is accomplished by means of a brominating agent. Suitable brominating agents include elemental bromine, N-bromosuccinimide, N-bromoacetamide, pyridine hydrobromide perbromide, cupric bromide, thionyl bromide, iodine bromide, and so forth. A particularly preferred brominating agent is elemental bromine.

The bromination reaction may be carried out in any inert organic solvent medium, for example, ethers such as tetrahydrofuran or dioxane, acetonitrile, acetic acid, and so forth. A particularly preferred reaction involves the use of elemental bromine in a neutral inert organic solvent such as diethyl ether, tetrahydrofuran or dioxane. The bromination reaction may be carried out over a temperature range of from about −20° to about +30°C, most preferably between about 0° and +20°C.

In the next reaction step, the 2α-bromo compound of formula VII is dehydrobrominated to afford the Δ¹-compound of formula VIII

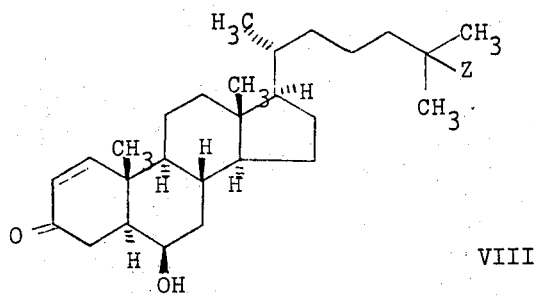

VIII wherein Z is as above.
The dehydrobromination reaction is carried out by means of a dehydrobrominating agent. Suitable dehydrobrominating agents include, for example, lithium chloride, lithium bromide, lithium carbonate, N,N-dimethylaniline, symmetrical and unsymmetrical collidines, potassium t-butoxide, 1,5-diazabicyclo [5.4.0.] undec-5-ene, 1,4-diazabicyclo [2.2.2.] octane, 1,5-diazabicyclo [4.3.0.] non-5-ene, and so forth. A particularly preferred dehydrobromination method involves the use of a mixture of lithium bromide and lithium carbonate.

The dehydrobromination reaction is carried out in an inert solvent medium such as dimethylformamide, dimethyl sulfoxide, benzene, toluene, xylene, decalin, diglyme, and so forth. If a base such as potassium t-butoxide is utilized as a dehydrobrominating agent, then a solvent such as t-butanol may be utilized and if a dehydrobrominating agent such as pyridine is utilized, this may also serve as the solvent. A particularly preferred solvent is dimethylformamide. The dehydrobromination reaction may be carried out at a temperature of from about 20° to about 200°C, most preferably from about 100° to about 150°C.

In the next reaction step, the Δ¹-double bond is epoxidized to afford the epoxide of formula IX

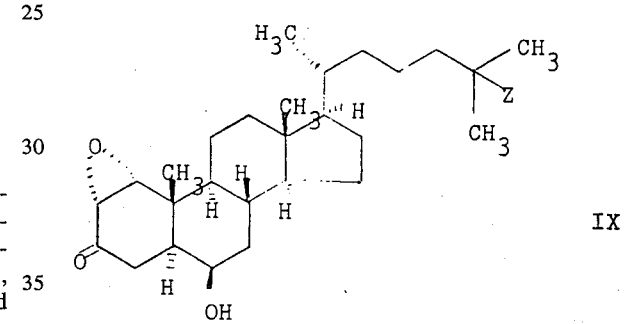

IX wherein Z is as above.

The epoxidation reaction is carried out by the use of hydrogen peroxide in the presence of a base such as an alkali metal hydroxide. As solvent media for the present reaction, there may be mentioned lower alkanols such as methanol and ethanol, and mixtures of the above with water. The epoxidation reaction may be carried out at a temperature of from about −20° to about +50°C, most preferably from about 0° to about +20°C.

The compound of formula IX is then converted to its 6β-sulfonate ester of formula X

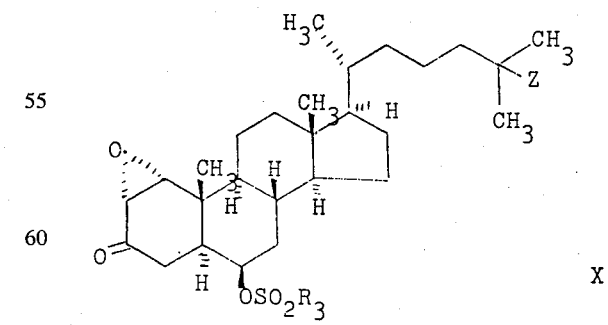

X wherein R₃ is lower alkyl or aryl, and Z is as above.
Suitable sulfonate esters include lower alkyl sulfonate esters such as methanesulfonates and ethanesulfonates; and aryl sulfonate esters, particularly benzenesulfonates and substituted benzenesulfonates such as p-toluenesulfonates, p-nitrobenzenesulfonates, p-bromobenzenesulfonates; naphthalenesulfonates; and so forth. The sulfonylation is suitably carried out by reacting the compound of formula IX with an active sulfonyl derivative such as, for example, a sulfonyl halide or a sulfonyl azide. The sulfonylation is preferably carried out in the presence of a base, most preferably an organic base, such as pyridine or triethylamine. The temperature for the sulfonylation reaction is suitably from about −20° to about +30°C, most preferably from about 0° to about +20°C.

In the next reaction step, the epoxide of formula X is opened to afford a 1α-hydroxy compound of formula XI

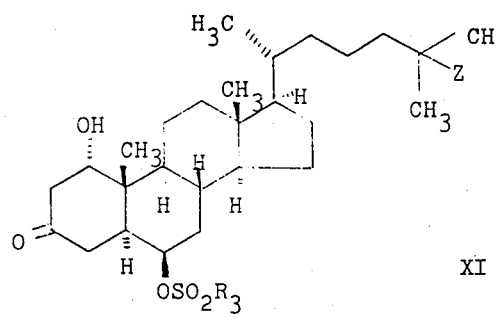

XI wherein $R_3$ and Z are as above.

This cleavage reaction may be accomplished by a number or reagents such as, for example, aluminum amalgam, cuprous chloride, cuprous acetate; or by catalytic hydrogenation (for example, utilizing platinum or palladium catalyst). A particularly preferred reagent is aluminum amalgam. It has been found that, surprisingly, the use of these reagents to open the 1α,2α-epoxy group to a 1α-alcohol, does not affect a 25-hydroxy group (if present), the very labile 6β-sulfonate ester, or result in dehydration of the 1α-hydroxy-3-ketone function. As suitable solvents for the present cleavage reaction, there may be mentioned lower alkanols such as methanol and ethanol, tetrahydrofuran, acetonitrile, and mixtures of the above with water. The temperature range for this reaction is from about 0° to about 100°C, most preferably from about 0° to about 30°C.

In the next step, the free keto group of the compound of formula XI is reduced to a 3β-alcohol to afford the compound of formula XII

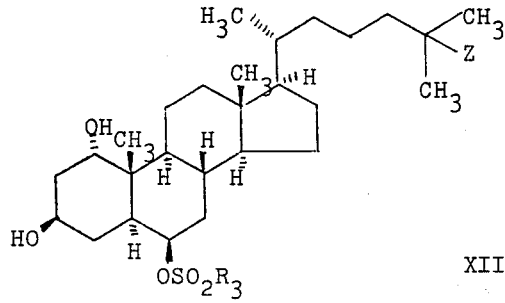

XII wherein $R_3$ and Z are as above.

The reagents, solvents and conditions for effecting this reduction are the same as described above for the conversion IV→V, except that alkali metal aluminum hydrides and lower alkyl aluminum hydrides are not preferred. The temperature range for this reaction can be from about −20° to about +20°C.

In the final step of the present reaction sequence, the sulfonyl ester group in the 6-position is eliminated to a $\Delta^5$-double bond, yielding the final product (1α-hydroxycholesterol or 1α,25-dihydroxycholesterol) of formula XIII

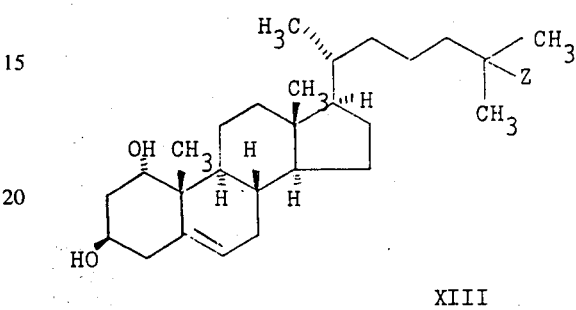

XIII wherein Z is as above.

This elimination reaction is suitably effected using similar reagents and conditions as for the conversion VII→VIII. A particularly preferred set of elimination conditions involves the use of lithium carbonate in dimethylformamide at a temperature between about 100° and 150°C.

1α,25-Dihydroxycholesterol may be converted to a 1,3-diester or a 1,3,25-triester by standard conditions well known in the art involving reaction with, for example, acetic anhydride, or acetic anhydride in the presence of a base such as pyridine. The triacetate of 1,25-dihydroxycholesterol has been previously converted, as mentioned above, to 1α,25-dihydroxycholecalciferol, which is an active metabolite of Vitamin $D_3$.

A further appreciation for the processes of the present invention and the preparation of the various intermediates may be obtained from the following examples. These examples are illustrative only of the invention and are not to be construed as limitative thereof in any manner.

EXAMPLE 1

To an ice-cooled solution of 50.00 g (0.113 mol) of 25-hydroxycholesteryl-3β-acetate in 75 ml of anhydrous tetrahydrofuran was added dropwise 465 ml of 1 M borane in tetrahydrofuran. The reaction mixture was stirred in the ice bath for 1.5 hr. then at room temperature for 1.5 hr. The reaction mixture was then cooled in an ice bath and 140 ml of 3 N sodium hydroxide solution was added dropwise followed by the dropwise addition of 140 ml of 30% hydrogen peroxide. Stirring in the ice bath was continued for 0.5 hr and then at room temperature for 0.5 hr. The total was then poured into 1500 ml of saturated sodium chloride solution and extracted with 500 ml of chloroform followed by 6 × 300 ml of chloroform. The combined organic extracts were washed with 1 l. of water, dried over anhydrous sodium sulfate, filtered, and the solvent evaporated in vacuo, to give 51.0 g of a crude mixture of 3β,6α,25-trihydroxy-5β-cholestane and 3β,6β,25-trihydroxy-5β- cholestane. The total finely ground crude product was suspended in 575 ml of ice-cooled acetone and this suspension was added to 73.5 ml of Jones reagent (26.72 g chromium trioxide, 23 ml conc. sulfuric acid diluted to 100 ml with water). The reaction mixture was stirred 0.5 hr at ice-bath temperature, 2 hr at room temperature, and then refrigerated for 12 hr. The excess Jones reagent was destroyed with isopropanol, the solution decanted away from the precipitate and poured into 800 ml of water. The solid precipitate was washed with 9 × 250 ml of dichloromethane and these washing were used to extract the aqueous layer. The combined dichloromethane washings were washed with saturated sodium chloride solution, dried over anhydrous sodium sulfate, filtered, and evaporated in vacuo to give 52.9 g of crude product. Recrystallization from acetone afforded two crops of 25-hydroxy-5α-cholestan-3,6-dione for a total weight of 34.7 g. Several recrystallizations from acetone afforded the analytical sample, mp 184°–188°C: $[\alpha]_D^{25}$ +3.62° (CHCl$_3$, c 1.0279); ir 3615, 1712 cm$^{-1}$; nmr (CDCl$_3$) δ1.21 (s, 6H), 0.96 (s, 3H), 0.94 (d, 3H, J = 5 Hz), 0.70 (s, 3H); mass spec m/e 398.

Anal. Calcd. for C$_{27}$H$_{44}$O$_3$ (MW 416.62): C, 77.83; H, 10.65. Found : C, 77.86; H, 11.00

EXAMPLE 2

To a solution of 1.0 g (2.4 mmol) of 25-hydroxy-5α cholestan-3,6-dione in 75 ml of dry methanol was added 30 mg of oxalic acid and the reaction mixture refluxed for 16 hr with the condensate passing over 15 g of Type 3A molecular sieves. The solvent was evaporated in vacuo, the residue dissolved in 100 ml chloroform, the solution washed with 50 ml of 2 N sodium carbonate, and then 50 ml of water. The organic layer was dried over anhydrous sodium sulfate, filtered, and evaporated in vacuo to give 1.10 g of 25-hydroxy-3,3-dimethoxy-5α-cholestan-6-one as a semi-solid: ir (CHCl$_3$) 3270, 1700 cm$^{-1}$; nmr (CDCl$_3$)δ 3.24 (s, 3H), 3.10 (s, 3H), 1.22 (s, 6H), 0.93 (d, 3H, J = 5 Hz), 0.75 (s, 3H), 0.67 (s, 3H).

EXAMPLE 3

To an ice-cooled solution of 13.8 g (30 mmol) of 25-hydroxy-3,3-dimethoxy-5α-cholestan-25-one dissolved in 250 ml of methanol was added dropwise a solution of 1.2 g (30 mmol) of sodium borohydride in 10 ml of water (stabilized with several drops of 1 N sodium hydroxide solution). After 1 hr, tlc indicated the complete disappearance of starting material. The reaction mixture was poured into 1 l. of water and extracted with chloroform. The combined extracts were dried over sodium sulfate, filtered and evaporated to dryness. Crystallization from acetone gave 8.68 g of 6β,25-dihydroxy-3,3-dimethoxy-5α-cholestane. The mother liquors were chromatographed on 430 g of Merck Silica Gel 60 and eluted with 1:1 ethyl acetate - dichloromethane. An additional 1.88 g of product was obtained for a total of 10.56 g. The analytical sample was obtained after several recrystallizations from acetone, mp 162°–165°C; $[\alpha]_D^{25}$ +13.35 (CHCl$_3$, c 0.9365); ir (CHCl$_3$) 3620 cm$^{-1}$; nmr (CDCl$_3$) δ 3.79 (m, 1H), 3.21 (s, 3H), 3.13 (s, 3H), 1.20 (s, 6H), 1.01 (s, 3H), 0.92 (d, 3H, J = 6 Hz), 0.68 (s, 3H); molecular ion m/e 464.

Anal. Calcd. for C$_{29}$H$_{54}$O$_2$ (MW 464.73): C, 74.95; H, 11.28. Found : C, 75.19; H, 11.23

EXAMPLE 4

To 2.39 g (5.1 mmol) of 6β,25-dihydroxy-3,3-dimethoxy-5α-cholestane dissolved in 125 ml acetonitrile-tetrahydrofuran (1:1 v/v) at room temperature was added 5 ml of 6 N hydrochloric acid. After stirring for 0.5 hr, tlc indicated complete disappearance of starting material. The reaction mixture was poured into 125 ml of water and extracted with chloroform. The combined organic extracts were dried over sodium sulfate and evaporated in vacuo. Crystallization of the crude residue from acetone afforded 1.49 g of 6β,25-dihydroxy-5α-cholestan-3-one. The mother liquors were chromatographed on 70 g of Merck Silica Gel 60 and eluted with 4:1 ethyl acetate-dichloromethane. An additional 0.63 g of product was obtained for a total of 2.12 g. Several recrystallizations from acetone gave the analytical sample, mp 192°–194°C; $[\alpha]_D^{25}$ +16.4 (CHCl$_3$, c 0.580); ir (CHCl$_3$) 3610, 1705 cm$^{-1}$; nmr (CHCl$_3$) 3.72 (broad, 1H), 1.21 (s, 9H), 0.93 (d, 3H, J = 5Hz), 0.72 (s, 3H); mass spec m/e 400.

Anal. Calcd for C$_{27}$H$_{46}$O$_3$ (MW 418.66): C, 77.46; H, 11.08. Found: C, 77.73; H, 11.14

EXAMPLE 5

To 6.39 g (15.3 mmol) of 6β,25-dihydroxy-5α-cholestan-3-one dissolved in 60 ml of anhydrous dioxane, under a nitrogen atmosphere, and cooled in a cold water bath, was added rapidly 40.5 ml of a 0.4 M solution of bromine in dioxane. Immediately after addition of the bromine solution (colorless reaction mixture), the total reaction mixture was poured into 210 ml of saturated sodium bicarbonate solution and extracted with 4 × 150 ml of chloroform. The combined organic extracts were dried over sodium sulfate, filtered, and evaporated in vacuo to give 7.6 g of crude solid reaction product. Crystallization from ethanol (0°C) afforded two crops weighing 5.62 g. The mother liquors (2.0 g) were chromatographed on 200 g of Merck Silica Gel 60 and eluted with ethyl acetate to give an additional 0.5 g of 2α-bromo-6β,25-dihydroxy-5α-cholestan-3-one for a total weight of 6.12 g, mp 174°–176°C; ir (CHCl$_3$) 3610, 1725 cm$^{-1}$; nmr (CDCl$_3$) δ 4.76 (d of d, 1H, J = 13 Hz, J = 6 Hz). 3.77 (m, 1H), 1.26 (s, 3H), 1.19 (s, 6H), 0.92 (d, 3H, J = 6 Hz), 0.71 (s, 3H); mass spec. m/e 478.

Anal. Calcd. for C$_{27}$H$_{45}$BrO$_3$·⅓H$_2$O (NW 503.52): C, 64.41; H, 9.14; Br 15.87. Found : C, 64.40; H, 9.13; Br 15.87

EXAMPLE 6

A mixture of 7.11 g (14.3 mmol) of 2α-bromo-6β,25-dihydroxy-5α-cholestan-3-one 7.11 g (82 mmol) of lithium bromide, and 7.11 g (96.4 mmol) of lithium carbonate in 70 ml of dry dimethylformamide under a nitrogen atmosphere was heated at 170°C for one-half hr. The reaction mixture was cooled to room temperature, poured into 1 l. of water, and extracted with ethyl acetate. The organic extracts were washed with water, dried over sodium sulfate, filtered, and evaporated in vacuo. The crude crystalline product was crystallized from acetone giving three crops of 6β,25-dihydroxy-5α-cholest-1-en-3-one, 5.21 g.

The mother liquors were chromatographed on 76 g of Merck Silica Gel 60 (0.063–0.20 mm) and eluted with ethyl acetate-dichloromethane affording an additional 0.157 g for a total weight of 5.36 g. The analytical sample was recrystallized from acetone, mp 191°–194°C; $[\alpha]_D^{25}$ +28.99° (c 1.0005, CHCl$_3$); ir (CHCl$_3$) 3620, 1670 cm$^{-1}$; nmr (CDCl$_3$): δ 7.05 (d, 1H, J = 10 Hz), 5.79 (d, 1H, J = 10 Hz), 3.88 (m, 1H), 1.18 (s, 9H), 0.91 (d, 3H, J = 5 Hz), 0.70 (s, 3H); $\lambda_{max}^{EtOH}$ 230 nm (ε 9,000); molecular ion m/e 416.

Anal. Calcd. for C$_{27}$H$_{44}$O$_3$ (MW 416.65): C, 77.84; H, 10.64. Found : C, 77.69; H, 10.60

EXAMPLE 7

To 5.27 g (12.6 mmol) of 6β,25-dihydroxy-5α-cholest-1-en-3-one dissolved in 170 ml of methanol and cooled in an ice-salt bath was added with rapid stirring 12.1 ml of 30% hydrogen peroxide followed immediately by 6.3 ml of 6 N sodium hydroxide solution. After 0.5 hr, tlc indicated reaction was complete. The reaction mixture was poured into 175 ml of water and extracted with chloroform. The combined extracts were dried over sodium sulfate, filtered, and the solvent evaporated in vacuo. The solid residue was crystallized from acetone affording 5.07 g of 1α,2α-epoxy-6β,25-dihydroxy-5α-cholestan-3-one.

The mother liquors were chromatographed on 4.0 g of Merck Silica Gel 60 and eluted with dichloromethane-ethyl acetate (3:1) affording an additional 0.132 g of product for a total of 5.2 g. The analytical sample was recrystallized several times from acetone, mp 197°–199°C; $[\alpha]_D^{25}$ +86.52° (c 0.8830, CHCl$_3$); ir (CHCl$_3$) 3615, 1720 cm$^{-1}$; nmr (CDCl$_3$) δ 3.81 (m, 1H), 3.40 (d, 1H, J = 4 Hz), 3.20 (d, 1H, J = 4 Hz), 1.20 (s, 6H), 1.05 (s, 3H), 0.93 (d, 3H, J = 6 Hz), 0.72 (s, 3H); mass spec m/e 414.

Anal. Calcd. for C$_{27}$H$_{44}$O$_4$ (MW 432.65): C, 74.96; H, 10.25. Found: C, 74.94; H, 10.15

EXAMPLE 8

To a rapidly stirred, cooled solution (−6°C) of 3.11 g (7.2 mmol) of 1α,2α-epoxy-6β,25-dihydroxy-5α-cholestan-3-one dissolved in 8 ml of dry pyridine was added 0.876 g (0.6 ml) of methanesulfonyl chloride. After 12 hr, an additional 0.090 g of methanesulfonyl chloride was added and the reaction mixture allowed to stand at −6°C for an additional 16 hr. The total reaction mixture was then poured into 50 ml of water and extracted with 3 × 40 ml of methylene chloride. The combined organic extracts were washed with 80 ml of 1 N hydrochloric acid, followed by 80 ml of water, and dried over anhydrous sodium sulfate. After filtration and evaporation of the solvent in vacuo, 4.0 g of crude product was obtained. The total reaction product was chromatographed on 300 g of Merck Silica Gel 60 and eluted with dichloromethane-ethyl acetate (2:1) to afford 2.58 g of 1α,2α-epoxy-6β-methylsulfonyloxy-5α-cholestan-25-ol-3-one. Recrystallization from ether gave 2.39 g of product. Several recrystallizations from acetone-Skelly B gave the analytical sample mp 95°–96°C; $[\alpha]_D^{25}$ +59.44° (CHCl$_3$, c 1.0430); nmr (CDCl$_3$) δ 4.76 (m, 1H), 2.32 (s, 2H), 1.28 (s, 6H), 0.99 (s, 3H), 0.91 (d, 3H, J = 5 Hz), 0.71 (s, 3H); ir (KBr) 3500, 1720, 1353, 1180, 907 cm$^{-1}$; mass spec m/e 492.

Anal. Calcd. for C$_{28}$H$_{46}$O$_6$S (MW 510.73): C, 65.84; H, 9.08; S, 6.28. Found: C, 65.93; H, 9.11; S, 6.10

EXAMPLE 9

To 2.04 g (4 mmol) of 1α,2α-epoxy-6β-methylsulfonyloxy-5α-cholestan-25-ol-3-one dissolved in 25 ml of 95% ethanol containing 1.5 ml of 10% sodium bicarbonate was added an excess of aluminum amalgam. The reaction mixture was stirred at room temperature and monitored by thin-layer chromatography. Additional amalgam was added at intervals until tlc showed the complete disappearance of starting material. The reaction mixture was diluted with 100 ml of chloroform, filtered through a pad of celite, and the solvent evaporated in vacuo to give 2.0 g of crude 1α,2,5-dihydroxy-6β-methylsulfonyloxy-5α-cholestan-3-one; nmr (CDCl$_3$) δ 4.80 (m, 1H), 4.0 (m, 1H), 3.0 (s, 3H), 1.22 (s, 6H), 1.12 (s, 3H), 0.93 (d, 3H, J = 6 Hz), 0.73 (s, 3H).

EXAMPLE 10

To the crude product from Example 9 (2.0 g) dissolved in 20 ml of 95% ethanol cooled to −5°C was added dropwise 0.5 ml of a solution containing 0.042 g (1.1 mmol) of sodium borohydride and 1/20 ml of 1 N sodium hydroxide. After 0.5 hr, an additional 0.010 g of solid sodium borohydride was added and stirring continued for an additional 0.5 hr. The excess sodium borohydride was destroyed with 3 ml of 10% acetic acid, the reaction mixture diluted with 50 ml of water, and then extracted with 4 × 50 ml of chloroform. The combined extracts were dried over anhydrous sodium sulfate, filtered, and evaporated in vacuo to give 2.1 g of crude 1α,3β,25-trihydroxy-6β-methylsulfonyloxy-5α-cholestane: nmr (CDCl$_3$) δ 4.85 (m, 1H), 4.03 (broad m, 1H), 3.75 (m, 1H), 3.0 (s, 3H).

EXAMPLE 11

To the crude product from Example 10, (2.1 g) dissolved in 25 ml of dry dimethylformamide at room temperature under a nitrogen atmosphere was added 2.2 g (0.027 mol) of lithium carbonate and the reaction mixture heated at 115°C for 1.33 hr. The total contents of the cooled reaction vessel were then poured into 100 ml of water and extracted with 4 × 50 ml of ethyl acetate. The combined organic extracts were washed with 5 × 50 ml of water, dried over anhydrous sodium sulfate, filtered and the solvent evaporated in vacuo to give 1.7 g of crude reaction product. Crystallization from acetone afforded 0.952 g of material which was chromatographed on 72 g of Merck Silica Gel 60 and eluted with 95% chloroform - 5% methanol to give 0.717 g of 1α,25-dihydroxycholesterol.

Column chromatography (Merck Silica Gel 60, ethyl acetate eluent) of the mother liquors gave an additional 0.297 g of product for a total weight of 1.01 g. Several recrystallizations from ethyl acetate gave the analytical sample, mp 162°–163°C: $[\alpha]_D^{25}$ −10.26° (methanol, c, 1.0920); ir (KBr) 3400 cm$^{-1}$; nmr (CDCl$_3$) δ 5.59 (m, 1H), 3.89 (broad m, 1H), 3.83 (m, 1H), 1.19 (s, 6H), 1.02 (s, 3H), 0.92 (d, 3H, J = 5 Hz), 0.67 (s, 3H): mass spec. molecular ion m/e 418, m/e 400.

Anal. Calcd. for C$_{27}$H$_{46}$O$_3$ (MW 418.66): C, 77.46; H, 11.98. Found: C, 77.26; H, 11.27

EXAMPLE 12

To 1α,25-dihydroxycholesterol (0.836 g, 2.0 mmol) dissolved in 10 ml of pyridine at room temperature was added acetic anhydride (0.224 g, 1.1 mmol). The reaction mixture was stirred at room temperature for 20 hr, poured into 50 ml of 10% sodium bicarbonate, and extracted with dichloromethane (3 × 40 ml). The combined extracts were dried over sodium sulfate, filtered, and evaporated in vacuo to give 0.80 g of 1α,25-dihydroxycholesterol 1,3-diacetate; ir (CHCl₃) 1735 cm⁻¹; nmr (CCDl₃) δ 5.5 (m, 1H), 5.05 (m, 1H), 4.9 (m, 1H), 2.05 (s, 3H), 2.01 (s, 3H), 1.20 (s, 6H), 1.08 (s, 3H).

EXAMPLE 13

To 1α,25-dihydroxycholesterol (0.836 g, 2.0 mmol) dissolved in 10 ml of pyridine at room temperature was added acetic anhydride (0.324 g, 3.18 mmol). The reaction mixture was then refluxed for 4 hr., cooled and worked up as above to give 0.95 g of 1α,25-dihydroxcholesterol 1,3,25-triacetate: ir (CHCl₃) 1735 cm⁻¹; nmr (CDCl₃) δ 5.6 (m, 1H), 5.1 (m, 2H), 2.12, 2.04, 2.0 (3s).

EXAMPLE 14

Following the procedures of Examples 1–11, starting with cholesteryl acetate, there was prepared 1α-hydroxycholesterol (m.p. 157°–9°C) via the following intermediates:

3β,6α-dihydroxy-5α-cholestane (diacetate m.p. 107°–9°C);
3β,6β-dihydroxy-5β-cholestane;
5α-cholestan-3,6-dione (m.p. 172°C);
3,3-dimethoxy-5α-cholestan-6-one;
6β-hydroxy-3,3-dimethoxy-5α-cholestane;
6β-hydroxy-5α-cholestan-3-one (m.p. 191.5°–193.5°C);
2α-bromo-6β-hydroxy-5α-cholestan-3-one (acetate m.p. 207°–8°)C;
6β-hydroxy-5α-cholest-1-en-3-one (m.p. 183°–4°C);
1α,2α-epoxy-6β-hydroxy-5α-cholestan-3-one (m.p. 183°–4°C);
1α,2α-epoxy-6β-methylsulfonyloxy-5α-cholestan-3-one;
1α-hydroxy-6β-methylsulfonyloxy-5α-cholestan-3-one; and
1α,3β-dihydroxy-6β-methylsulfonyloxy-5α-cholestane.

We claim:
1. A compound of the formula

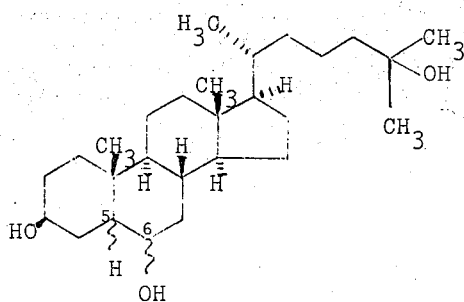

with the proviso that the hydrogen atom in the 5-position and the hydroxyl group in the 6-position are cis to each other.

2. The compound of claim 1 which is 3β,6α,25-trihydroxy-5α-cholestane.

3. The compound of claim 1 which is 3β,6β,25-trihydroxy-5β-cholestane.

4. A compound of the formula

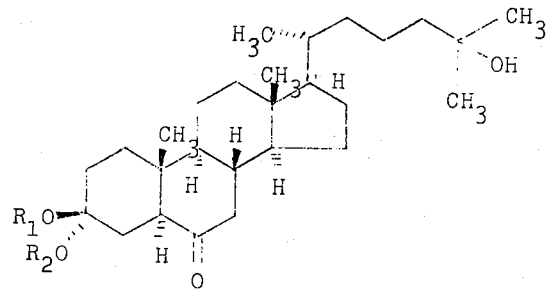

wherein R₁ and R₂ taken independently are each lower alkyl, and R₁ and R₂ taken together are lower alkylene of from 2 to 4 carbon atoms.

5. The compound of claim 4 which is 25-hydroxy-3,3-dimethoxy-5α-cholestan-6-one.

6. A compound of the formula

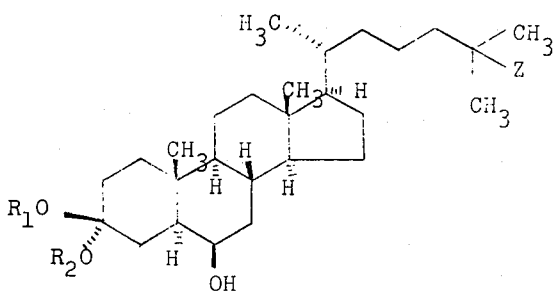

wherein R₁ and R₂ taken independently are each lower alkyl, and R₁ and R₂ taken together are lower alkylene of from 2 to 4 carbon atoms, and Z is hydrogen or hydroxyl.

7. The compound of claim 6 which is 6β,25-dihydroxy-3,3-dimethoxy-5α-cholestane.

8. The compound of claim 6 which is 6β-hydroxy-3,3-dimethoxy-5α-cholestane.

9. 6β,25-dihydroxy-5α-cholestan-3-one.

10. 2α-bromo-6β,25-dihydroxy-5α-cholestan-3-one.

11. 6β,25-dihydroxy-5α-cholest-1-en-3-one.

12. 1α,2α-epoxy-6β,25-dihydroxy-5α-cholestan-3-one.

13. A compound of the formula

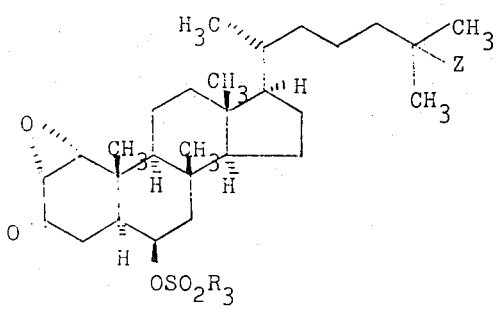

wherein R₃ is lower alkyl or aryl, and Z is hydrogen or hydroxyl.

14. The compound of claim 13 which is 1α,2α-epoxy-6β-methylsulfonyloxy-5α-cholestan-25-ol-3-one.

15. The compound of claim 13 which is 1α,2α-epoxy-6β-methylsulfonyloxy-5α-cholestan-3-one.

16. A compound of the formula

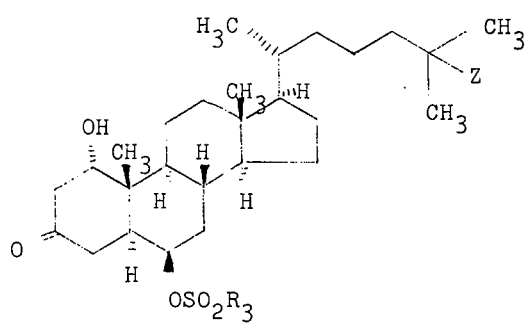

wherein $R_3$ is lower alkyl or aryl and Z is hydrogen or hydroxyl.

17. The compound of claim 16 which is 1α,25-dihydroxy-6β-methylsulfonyloxy-5α-cholestan-3-one.

18. The compound of claim 16 which is 1α-hydroxy-6β-methylsulfonyloxy-5α-cholestan-3one.

19. A compound of the formula

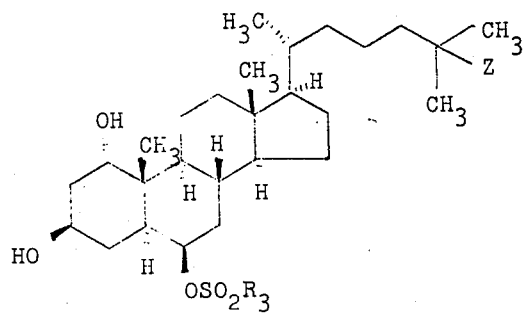

wherein $R_3$ is lower alkyl or aryl and Z is hydrogen or hydroxyl.

20. The compound of claim 19 which is 1α,3β,25-trihydroxy-6β-methylsulfonyloxy-5α-cholestane.

21. The compound of claim 19 which is 1α,3β-dihydroxy-6β-methylsulfonyloxy-5α-cholestane.

22. A process for the preparation of 2α-bromo-6β,25-dihydroxy-5α-cholestan-3-one which comprises contacting 6β,25-dihydroxy-5α-cholestan-3-one with bromine in a neutral inert organic solvent.

23. The process of claim 22 wherein the solvent is diethyl ether, tetrahydrofuran or dioxane.

24. The process of claim 22 wherein the temperature is between about −20° and +30°C.

25. A process for the preparation of a compound of the formula

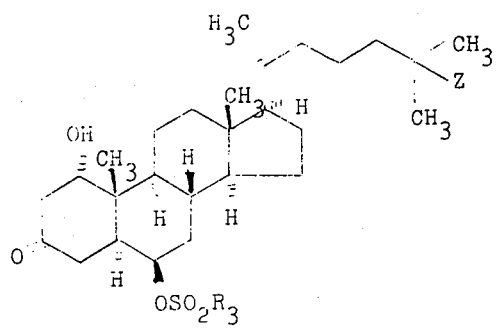

wherein $R_3$ is lower alkyl or aryl and Z is hydrogen or hydroxyl, which comprises contacting a compound of the formula

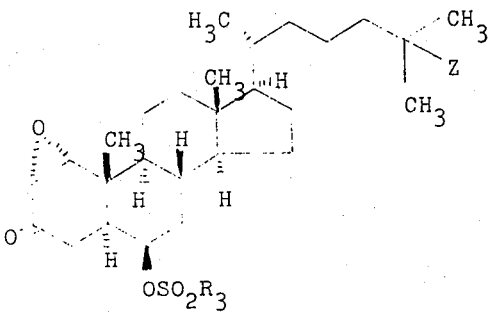

wherein $R_3$ and Z are as above, with a reagent selected from the group consisting of aluminum amalgam; cupric chloride; cupric acetate; and hydrogen in the presence of a noble metal catalyst.

26. The process of claim 25 wherein the reagent is aluminum amalgam.

27. The process of claim 26 wherein the temperature is between about 0° and 100°C.

28. The process of claim 26 wherein the reaction is conducted in a medium comprising a lower alkanol.

* * * * *